United States Patent [19]

Heimberger et al.

[11] 3,897,192
[45] July 29, 1975

[54] APPARATUS FOR MAKING MONOFILAMENTARY SLIDE-FASTENER MEMBERS

[75] Inventors: Helmut Heimberger, Locarno, Switzerland; Karl Griessbaum, Essen, Germany

[73] Assignee: Opti-Holding AG, Glarus, Switzerland

[22] Filed: June 5, 1974

[21] Appl. No.: 476,598

[30] Foreign Application Priority Data
June 9, 1973   Germany............................ 2329637

[52] U.S. Cl. ................. 425/391; 425/814; 264/285
[51] Int. Cl. ........................ B29d 5/00; B29c 17/02
[58] Field of Search.................... 425/814, 391, 392; 264/285; 29/207.5 R

[56] References Cited
UNITED STATES PATENTS

| | | | |
|---|---|---|---|
| 3,461,486 | 8/1969 | Porepp................................ | 425/391 |
| 3,541,638 | 11/1970 | Porepp............................ | 425/814 X |
| 3,672,805 | 6/1972 | Porepp............................ | 425/814 X |
| 3,770,361 | 11/1973 | Heimberger..................... | 425/814 X |
| 3,787,164 | 1/1974 | Jakob.............................. | 425/814 X |

Primary Examiner—Francis S. Husar
Assistant Examiner—David S. Safran
Attorney, Agent, or Firm—Karl F. Ross; Herbert Dubno

[57] ABSTRACT

Two synthetic-resin monofilaments are deposited from opposite sides on a continuously moving horizontal carrier strip provided with two rows of longitudinally spaced upstanding lugs disposed along opposite edges thereof. Each monofilament is entrained along an upwardly convex ridge of a respective guide element by a coacting transport element hugging that edge with a concave underside which has a bulge for deforming the filament to provide it with successive coupling heads, the transport elements being swingable in planes transverse to the carrier strip whereas the guide elements are vertically reciprocable to engage and disengage the respective monofilaments in timed relationship with the movement of the associated transport elements and the carrier strip between whose lugs these monofilaments are inserted in the form of narrow loops each carrying one coupling head.

6 Claims, 4 Drawing Figures

APPARATUS FOR MAKING MONOFILAMENTARY SLIDE-FASTENER MEMBERS

FIELD OF THE INVENTION

Our present invention relates to an apparatus for making slide-fastener members of the monofilamentary type in the form of flattened coils of thermoplastic synthetic resin such as nylon.

BACKGROUND OF THE INVENTION

It has already been proposed (see French Pat. No. 2,007,145) to feed a resinous monofilament through a stationary tubular guide to a unidirectionally movable carrier element provided with longitudinally spaced lugs or teeth, the monofilament being deformed at spaced locations so as to present a series of coupling heads which come to lie at the free ends of successive loops, received in the spaces between the lugs, as the monofilament is intermittently advanced by a pair of coacting transport rollers. The presence of the coupling-head deformations makes it necessary to give the tubular guide an inner diameter large enough to accommodate the deformed portions each constituted by a pair of lateral excrescences and an intervening depression. As a result, the monofilament is guided only loosely and cannot be advanced at high speed; also, the carrier element must be halted during insertion of a loop to ensure proper alignment of the monofilament with the lug spaces.

OBJECTS OF THE INVENTION

The general object of our present invention is to provide an improved apparatus of this character having means for precisely guiding such a monofilament, or a pair of monofilaments, to eliminate the aforestated drawbacks in the production of either a single slide-fastener member or a pair of such members interlinked with each other.

A more practical object is to provide an apparatus of this nature wherein the formation of the coupling heads is carried out by the same implements that feed the monofilament or monofilaments to the carrier element.

SUMMARY OF THE INVENTION

These objects are realized, in conformity with our present invention, by the provision of feed means in the form of a guide element and a coacting transport element on a frame on which the carrier element with its row or rows of upstanding lugs is movably mounted, the guide element having a ridge which lies in a plane transverse to the direction of carrier movement in closely spaced relationship with the transport element for clamping the monofilament therebetween; the transport element is provided with a bulge which faces the ridge of the associated guide element for locally deforming an engaged loopforming section of the monofilament to produce the aforementioned coupling heads. As the transport element oscillates along the ridge of the guide element in timed relationship with the movement of the carrier element, under the control of a common drive mechanism, the positive engagement of the bulge of the transport element with a deformed portion of the monofilament precisely determines the length of each section inserted during a cycle of reciprocation. By virtue of this positive engagement, and of the precise guidance given the monofilament by the coacting elements referred to, it is possible to drive the apparatus at high speed and to move the carrier element continuously at a constant rate, with resulting simplification of the drive mechanism.

According to another feature, the guide element is reciprocable toward and away from the associated transport element under the control of the common drive mechanism, i.e. in a substantially vertical direction if the filament-supporting surface of the carrier element is more or less horizontal. This reciprocation of the guide element is so timed as to release the monofilament immediately after the insertion of a loop-forming section thereof between consecutive lugs of the carrier element.

Advantageously, pursuant to a further feature of our invention, the ridge is convex toward the transport element which has a complementary concave edge provided with the afore-mentioned bulge.

By duplicating the above-described feed means on opposite sides of the carrier element, which we prefer to design as an endless band, we can deposit two monofilaments in overlapping relationship between the two rows of lugs extending along opposite longitudinal edges of the carrier. Such interlocking, however, is not essential, since the precise feeding of the monofilament allows the loops to be fitted closely between the lugs so as to be held frictionally in position on the advancing carrier. Apparatus according to our invention, therefore, allows the manufacture of individual fastener members or pairs of such members with or without interlocking.

BRIEF DESCRIPTION OF THE DRAWING

The above and other features of our invention will now be described in detail with reference to the accompanying drawing in which.

SPECIFIC DESCRIPTION

Figure 1:
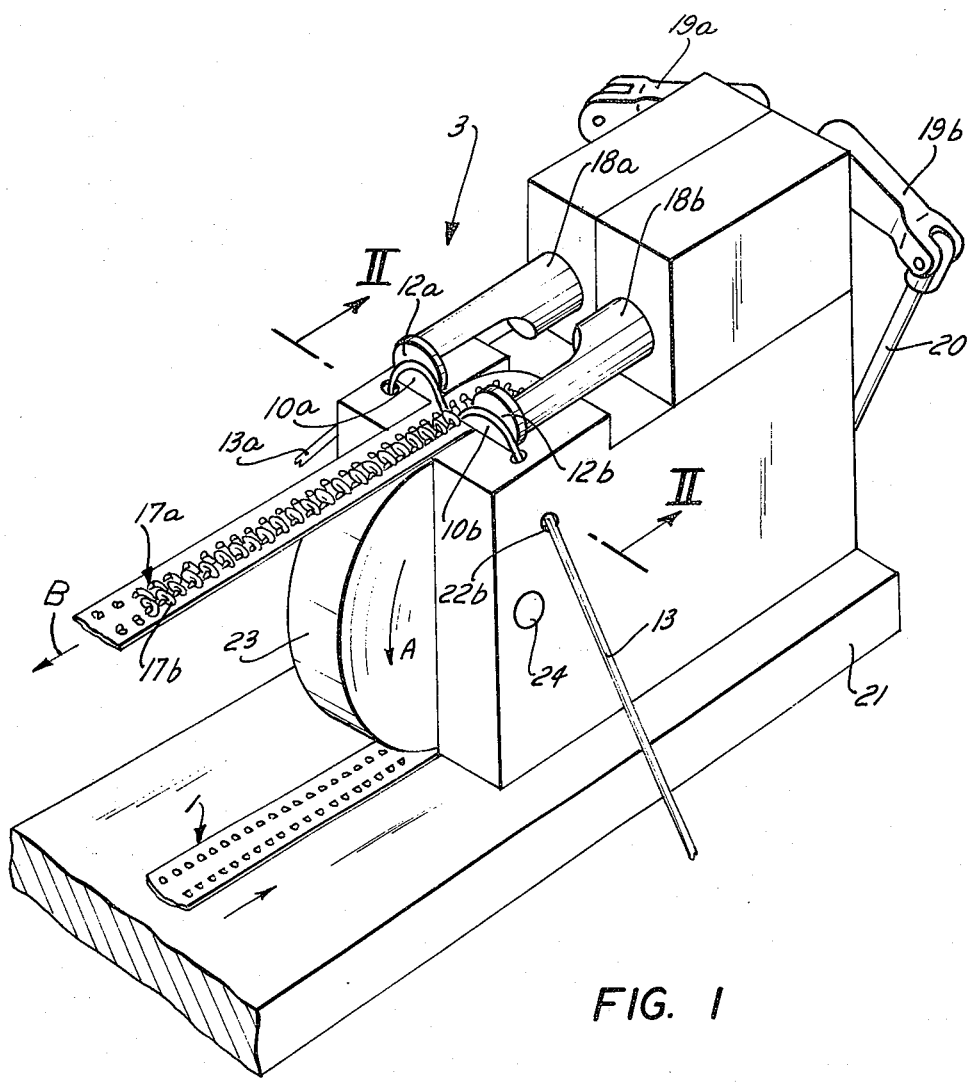
FIG. 1 is a perspective view of an apparatus embodying our invention.

The apparatus shown in the drawing comprises a frame 21 on which there is mounted a carrier element 1 in the form of an endless band wound about a pair of flat-surfaced rollers 23 (only one shown). Roller 23 is continuously driven at a constant rate, via a nonillustrated motor and transmission (counterclockwise in FIG. 1) as indicated by an arrow A, thereby displacing the band 1 from right to left (arrow B).

Figure 4:
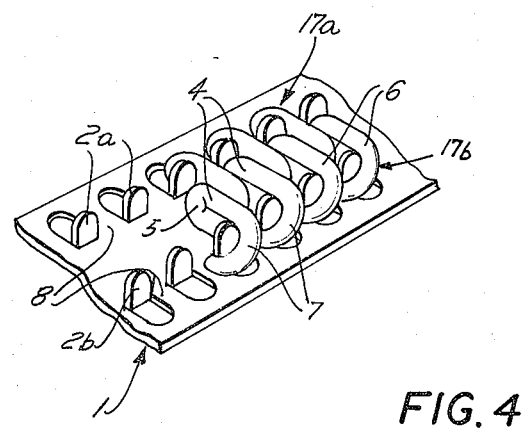
FIG. 4 is a perspective detail view of a section of a carrier element included in FIG. 1, drawn to a larger scale.

As best seen in FIG. 4, the band 1 (which may be a sheet-metal strip) has two series of upstanding lugs 2a, 2b which are separated by gaps 8 and extend along opposite longitudinal edges thereof, these lugs being partly punched out from the strip and erected so as to project vertically upwardly from its surface. It will also be noted that the two rows of lugs 2a, 2b are relatively staggered in the longitudinal direction, with a lug of one row confronting a gap 8 of the other.

Frame 21 has a pair of cheeks, flanking the roller 23, formed with respective slanting bores 22a, 22b traversed by a pair of monofilaments 13a, 13b which are engaged by a feed mechanism 3 for emplacement on the upper band surface as a pair of interlinked coils 17a, 17b whose turns form flattened loops lodged in the gaps 8; each loop comprises a pair of elongate shanks 6, a front bight portion 4 and a rear bight portion 7. Bight portions 4 are provided with deformations 5 serving as coupling heads by which the two coils 17a and 17b are interlocked; the major part of each loop lies in a vertical plane transverse to the band 1, its rear bight portion 7 reaching around an adjoining lug 2a or 2b as a link with a previously formed loop.

The feed mechanism 3 comprises a pair of guide elements 10a, 10b, of generally semicircular configuration, and a pair of coacting transport elements 12a, 12b, each of these elements having a narrow body lying in a plane perpendicular to the direction of carrier motion B; the width of these bodies substantially equals the diameter of filaments 13a and 13b, elements 10a and 12a lying in a common plane with bore 22a whereas elements 10b and 12b lie with bore 22b in a plane offset from the former by half the lug spacing. The guide elements 10a and 10b have upwardly convex arcuate ridges 11a, 11b which are closely spaced from circularly concave lower edges 15a and 15b of transport elements 12a and 12b, these edges and ridges having common centers 16a and 16b in line with the axes of respective shafts 18a and 18b journaled in frame 21.

Edges 15a and 15b are provided with respective bulges 14a and 14b serving to indent the filaments 13a and 13b so as to form the coupling heads 5 thereof, these indentations being positively engaged by the bulges 14a and 14b as elements 12a and 12b oscillate about their fulcra 16a and 16b as indicated by arrows C. This oscillation is brought about by arms 19a, 19b which are rigid with shafts 18a, 18b and which are connected by pitmans 20 (only one shown) to a nonillustrated crank drive coupled with the shaft 24 of roller 23. Guide elements 10a and 10b have stems 9a and 9b which are vertically slidable in frame 1, as indicated by arrows D, under the control of nonillustrated cams also synchronized with the drive shaft 24.

Figure 3:
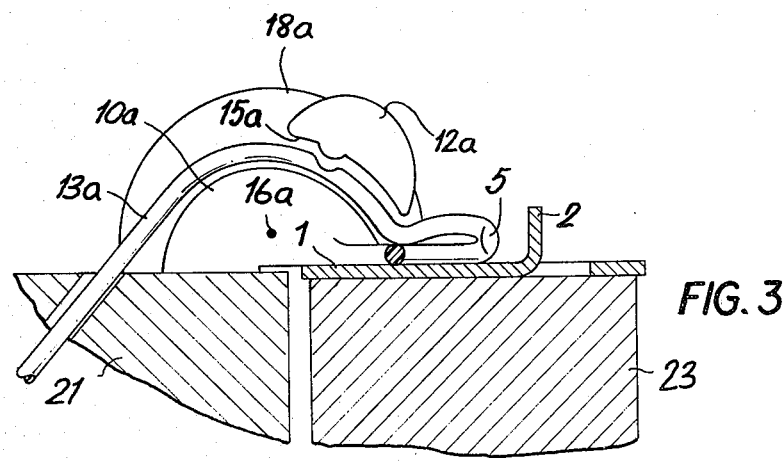
FIG. 3 is a view similar to FIG. 2, illustrating an alternate position.
Figure 2:
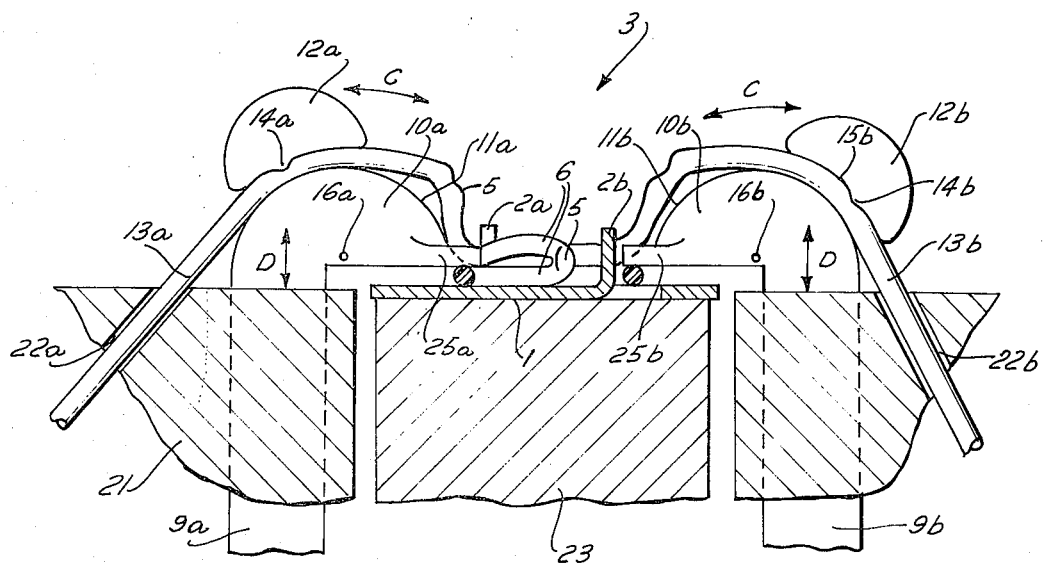
FIG. 2 is a fragmentary cross-sectional view taken on the line II—II of FIG. 1.

In operation, with the transport elements 12a and 12b swung out as shown in FIG. 2, guide elements 10a and 10b are moved up to engage the monofilaments 13a and 13b with deformation thereof by the bulges 14a and 14b. Next, as illustrated for the element 12a in FIG. 3, the two transport elements are swung inwardly whereby the filament buckles at the previously formed coupling head 5 and falls into place between two adjoining lugs 2a or 2b. Elements 10a, 10b have bifurcate extensions 25a, 25b which straddle the looped filament sections until these elements are lowered, as shown for the element 10a in FIG. 3, to release the filament and allow a return swing of the transport element 12a or 12b as its bulge leaves the indentation just formed. The swing of the two transport elements 12a and 12b may be in phase (i.e. both moving in or out simultaneously) or in phase opposition (alternate inward swing of the two elements).

It will be apparent that other types of carriers, such as narrow cylinders similar to roller 23 but formed with upstanding lugs or teeth, could be used in lieu of the endless band 1. The shape of the lugs and their mounting on the carrier may also be modified.

We claim:

1. An apparatus for making slide-fastener members, comprising:
    a frame;
    a carrier element mounted on said frame for unidirectional movement, said carrier element being provided with at least one row of lugs rising from a surface thereof, said lugs being spaced apart in the direction of said movement;
    feed means on said frame alongside said carrier element for depositing a resinous monofilament on said surface thereof in a succession of narrow loops received between consecutive lugs, said feed means including a guide element with a ridge in a plane perpendicular to said direction of movement and a transport element in closely spaced relationship therewith for clamping said monofilament therebetween, said transport element being provided with a bulge facing said ridge for locally deforming an engaged loop-forming section of said monofilament to provide a coupling head at a free end of each loop; and
    drive means for reciprocating said transport element along said ridge in timed relationship with the movement of said carrier element for intermittently advancing successive loop-forming sections of said monofilament into the spaces between consecutive lugs.

2. An apparatus as defined in claim 1 wherein said guide element is coupled with said drive means for reciprocation toward and away from said transport element for releasing said monofilament immediately after the insertion of a loop-forming section thereof between consecutive lugs.

3. An apparatus as defined in claim 1 wherein said ridge is circularly convex toward said transport element, the latter having a circularly concave edge concentric with said ridge provided with said bulge.

4. An apparatus as defined in claim 1 wherein said lugs form two parallel rows extending along opposite longitudinal edges of said carrier element, said feed means being duplicated on opposite sides of said carrier element for depositing two monofilaments in overlapping relationship between the lugs of said rows.

5. An apparatus as defined in claim 4 wherein the lugs of said rows are relatively longitudinally staggered, the guide and transport elements on one side of said carrier element being longitudinally offset from the guide and transport elements on the other side of said carrier element.

6. An apparatus as defined in claim 1 wherein said carrier element is an endless band.

* * * * *